(12) United States Patent
Takasaki

(10) Patent No.: US 9,453,924 B2
(45) Date of Patent: Sep. 27, 2016

(54) RADIATION CONTROL APPARATUS AND METHOD FOR ACQUIRING CORRECTION DATA FOR AN IMAGING DEVICE

(75) Inventor: Takashi Takasaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 636 days.

(21) Appl. No.: 13/554,778

(22) Filed: Jul. 20, 2012

(65) Prior Publication Data

US 2013/0020478 A1 Jan. 24, 2013

(30) Foreign Application Priority Data

Jul. 23, 2011 (JP) .................................. 2011-161430

(51) Int. Cl.
*G01T 1/17* (2006.01)
*G01T 1/24* (2006.01)

(52) U.S. Cl.
CPC ..................................... *G01T 1/247* (2013.01)

(58) Field of Classification Search
CPC ..................................................... G01T 1/247
USPC ....................................................... 250/252.1
See application file for complete search history.

(56) References Cited

U.S. PATENT DOCUMENTS 5,572,312 A * 11/1996 Karlsson et al. ................ 356/46
2003/0010921 A1 * 1/2003 Hoheisel ................... 250/370.07

FOREIGN PATENT DOCUMENTS

| JP | 2003125203 A | 4/2003 |
| JP | 2007-275475 A | 10/2007 |
| JP | 2010-187805 A | 9/2010 |

OTHER PUBLICATIONS

Machine Translation of JP 2003-125203.*

* cited by examiner

*Primary Examiner* — Yara B Green
(74) *Attorney, Agent, or Firm* — Canon U.S.A. Inc., IP Division

(57) ABSTRACT

A radiation control apparatus includes a determination unit configured to determine dose values of exposures to a radiation detector for acquiring correction images, corresponding to measured input-output characteristics of the radiation detector, and a acquisition unit configured to acquire correction data for the input-output characteristics of the radiation detector, based on the correction images acquired from the detector exposed at the determined dose values.

18 Claims, 16 Drawing Sheets

$$X_{n+1} = X_n + K \frac{dY}{dX}\bigg|_{X=X_n}$$

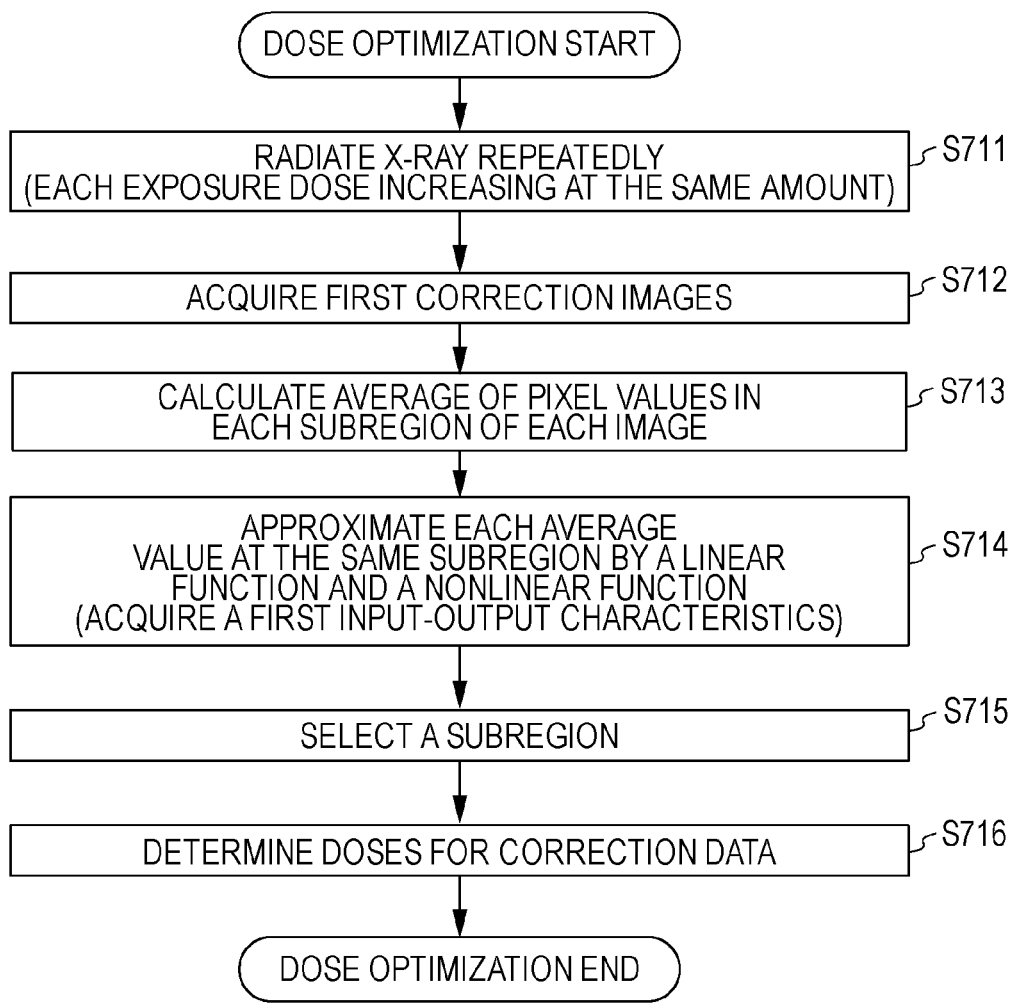

$$X_{n+1} = X_n + K \frac{Y_n - Y_{n-1}}{X_n - X_{n-1}}$$

FIG. 15

$$\begin{cases} S_{proc} = S_{org} - \gamma_{ijk} \times \sum_{n=1}^{N} \{\alpha_n \times F(Sus_{n-1} - Sus_n)\} \\[6pt] S_{proc}\text{: NOISE-REDUCED IMAGE} \\ S_{org}\text{: ORIGINAL IMAGE} \\ Sus_n\text{: SMOOTHED IMAGE} \\ F(\ )\text{: FUNCTION FOR EXTRACTING NOISE} \\ \alpha_n\text{: FREQUENCY-DEPENDENT COEFFICIENT} \quad (0.0 \text{ TO } 1.0) \\ \gamma_{ijk}\text{: DOMAIN-DEPENDENT COEFFICIENT} \quad i, j\text{: ROI} \quad k\text{: DOSE LEVEL} \\ n\text{: SMOOTHING LEVEL} \end{cases}$$

RADIATION CONTROL APPARATUS AND METHOD FOR ACQUIRING CORRECTION DATA FOR AN IMAGING DEVICE

BACKGROUND

Digital imaging devices, using solid state image sensing devices, are widely used in medical imaging domain and industrial imaging domain. For example, digital X-ray detectors are converting X-rays to electrical signals for imaging inside subjects.

In general, a plurality of pixels in the solid state image sensing device have slightly different sensitivities for detection of light or X-ray. For improving output image quality the differences in sensitivity are corrected by a correction image which has information of the differences. The correction image will be acquired by an X-ray tube radiating X-rays to a X-ray detector with no subject between the X-ray tube and the X-ray detector.

For detectors whose input-output characteristics are not linear, Japanese patent application Laid Open JP2003-125203 discloses a calibration technique for acquiring multiple X-ray correction images. In each exposure for the multiple correction images the dose value increases at the same value. By using multiple correction images the differences in sensitivities of the plurality of pixels are corrected in a certain incoming dose range.

However, if the dose values of the multiple exposures increases at the same amount, the accuracy of approximation of nonlinear input-output characteristics may be relatively low, compared to the linear characteristics.

SUMMARY

According to some embodiments disclosed herein, a radiation control apparatus includes a determination unit configured to determine dose values of exposures to a radiation detector for acquiring correction images, corresponding to measured input-output characteristics of the radiation detector. The radiation control apparatus also includes an acquisition unit configured to acquire correction data for the input-output characteristics of the radiation detector, based on the correction images acquired from the detector exposed at the determined dose values.

Further features of the embodiments of the present invention will become apparent from the following description of exemplary embodiments (with reference to the attached drawings).

BRIEF DESCRIPTION OF THE DRAWINGS

FIG. 7 is a flowchart of a process for optimizing a dose for acquiring calibration data, in accordance with one embodiment.

FIG. 15 is a set of function representative of image processing in accordance with one embodiment.

DESCRIPTION OF THE EMBODIMENTS

Figure 1:
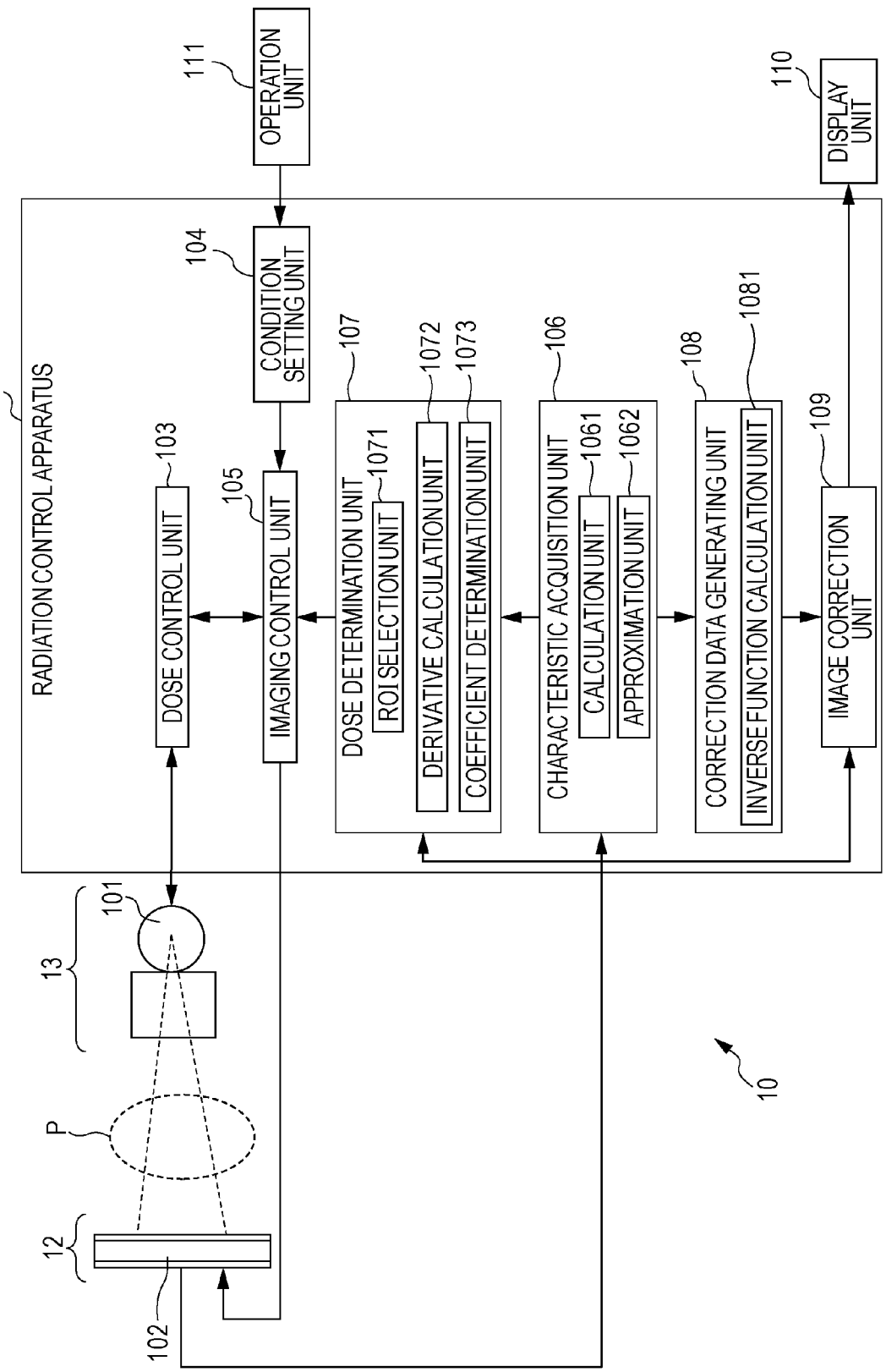
FIG. 1 is a diagrammatical overview of a radiation imaging system in accordance with one embodiment of the present invention.

In the following detailed description, for purposes of explanation, specific details are set forth in order to provide a thorough understanding of the disclosed embodiments. It will be apparent, however, that one or more embodiments may be practiced without these specific details. In other instances, well-known structures and devices are schematically shown in order to simplify the drawing. In referring to the description, specific details are set forth in order to provide a thorough understanding of the examples disclosed. In other instances, well-known methods, procedures, components and circuits have not been described in detail as not to unnecessarily lengthen the present disclosure. Some embodiments of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse or pointing device) for communicating user input information and command selections to the processor.

As will be understood by person having ordinary skill in the art, the present examples may be embodied as a system, method or tangible non-transitory computer program product. Accordingly, some examples may take the form of an entirely hardware embodiment, and entirely software embodiment (including firmware, resident software, microcode, etc.) or an embodiment combining software and hardware aspects that may all generally be referred to herein as a "circuit", "module" or "unit". Further, some embodiments may take the form of a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored on non-transitory computer-readable media that when read by a computer can direct the computer or other programmable data processing apparatus to function in a particular manner to implement the function/act/step specified in the flowchart and/or block diagram. Referring now to the drawings, where like reference numerals refer to like parts, exemplary embodiments of the invention are described in detail.

FIG. 1 is a diagrammatical overview of a radiation imaging system 10 in accordance with one embodiment. In the illustrated embodiment, radiation imaging system 10 includes a radiation control apparatus 11, X-ray detection unit 12 and X-ray generation unit 13. X-ray detection unit 12 detects X-ray radiation emitted from the X-ray generation unit 13, and transmitted through a subject P, and generates X-ray image data which represents the intensity of the transmitted X-ray radiation reached at each point of the detection area of the X-ray detection unit 12. Due to the materials of the X-ray detection unit 12 or the manufacturing process, sensitivity to X-ray radiation at each point is slightly different in the detection area.

The radiation control 10 includes a dose determination unit 107 determining dose values of exposures to the X-ray detection unit 12 for acquiring correction images, corresponding to measured input-output characteristics of the X-ray detection unit 12. And correction data acquisition unit 108 acquires correction data for the input-output characteristics of the X-ray detection unit 12, based on the correction images acquired from the detection unit 12 exposed at the dose values determined by the dose determination unit 107. Using the correction data, the sensitivity of the X-ray detection unit 12 may be corrected precisely.

The X-ray detection unit 12 includes a two-dimensional array of photoelectric conversion elements arranged in a matrix of rows and columns. Each photoelectric conversion element and at least one switch element connected to the photoelectric conversion element, which selectively outputs or accumulates electric signals, configure a pixel. Each pixel has a slightly different input-output characteristic, which shows the relationship between output pixel value and the incoming X-ray dose value.

Although the input-output characteristic generally shows linearity, for high-dose values a pixel starts to be saturated rather quickly. For this reason, the input-output characteristic of a given pixel shows non-linearity and the output response tends to be more sluggish than for low-dose values. In particular, for a high-dose value above a certain threshold, most pixels become completely saturated, and the output thereof becomes a constant value.

Accordingly, because the output-input characteristic of each pixel can be affected by high-dose radiation as described above, the radiation detection unit (detector) 12 as a whole comprises an unevenness of sensitivity. This unevenness of sensitivity causes that a resulting radiation image to be inaccurate. The effect of the unevenness of sensitivity on the radiation image can be corrected by correction data which cancels the unevenness of the detector.

The dose determination unit 107 determines the dose values to be applied to the X-ray generation unit 13. More specifically, the dose determination unit 107 establishes (determines) values of dose radiation in terms of radiation intensity with which the radiation detector will be irradiated. Notably, the dose determination unit 107 determines dose values so that the radiation dose increases at small values in a dose range where a increase rate of a output values of the X-ray detection unit 12 with respect to a incoming dose value is relatively small, and vice versa, as explained below in more detail. From the data acquired by radiations emitted at the determined dose values, the relationship between incoming dose values and output values of each pixel or groups thereof can be precisely measured and controlled.

The radiation imaging system 10 may include an operation unit 111 which is operated by an operator, and which receives input for the operation of the radiation imaging system 10. Imaging conditions, which are set by a condition setting unit 104, are input from the operation unit 111 by the operator. Based on the imaging conditions, the imaging control unit 105 controls the dose control unit 103, X-ray detection unit 12 and X-ray generation unit 13, etc., which enables radiation imaging.

The radiation control apparatus 11 further includes an image correction unit 109 which applies gain correction to the radiation image obtained from the X-ray detection unit 12. The image correction unit 109 may also perform certain image processing. In this manner, the corrected and the processed image data are displayed on the display unit 110.

A characteristic acquisition unit 106 calculates the input output characteristic for each pixel or each of a group of pixels. The characteristic acquisition unit 106 acquires a set of correction images (first correction images) obtained by the X-ray detection unit 12 detecting X-ray radiation emitted at a variety of dose values. For the first time each of the dose values may be increasing at the same dose increase amounts. The correction images may be imaged without any subject placed between the X-ray detection unit 12 and the X-ray generation unit 13.

The characteristic acquisition unit 106 may include calculation unit 1061 and an approximation unit 1062. The calculation unit 1061 calculates a value representative of each region of interest (ROI) of the correction images. The representative value may be an average or a median of the pixel values in each ROI. The approximation unit 1062 approximates the input-output function of each ROI. In the function the output values are the calculated representative values of the correction images obtained at different dose values. The input values are the dose values for irradiating the X-ray detection unit 12 for generating the correction images. The dose values may be measured by a dosimeter. In one embodiment the dosimeter may be integrally formed with the X-ray generation unit 13.

The dose determination unit 107 determines the dose values for another set of correction images (second correction images), based on the input-output characteristics acquired by the characteristic acquisition unit 106.

The dose determination unit 107 may include a ROI selection unit 1071, a derivative calculation unit 1072, and a coefficient determination unit 1073. The ROI selection unit 1071 selects a ROI from a plurality of ROIs which each of the correction image is divided into. The selection unit 1071 may select the ROI whose input-output characteristic is the worst in all ROIs. For example, the selection unit 1071 may select the ROI that shows saturation at the lowest dose value. Using the worst ROI may provide precise characteristics of entire region of the X-ray detection unit 12.

From the selected ROI the derivative calculation unit 1072 calculates a derivative function, which shows a rate of increase of the output pixel value at a unit increase of the input dose value.

The coefficient determination unit 1073 determines a coefficient for determining dose values corresponding to the derivative function of the input-output characteristic. The coefficient may determine the increase amounts of the radiation dose to be emitted by the radiation generation unit. More specifically, based on the coefficient, where the derivative value of the derivative function at a certain dose value becomes larger, the intensity value of the radiation dose becomes larger. In contrast, where the derivative value of the derivative function at a certain dose value becomes smaller, which means the input-output function starts to be saturated, the interval or intensity value of the radiation dose becomes smaller. By the determined dose values the correction images (second correction images) can indicate more precise input-output characteristic than those by the dose values at the same increase amounts, especially in the dose range where the characteristic shows nonlinearity and the pixels start to be saturated.

The correction data generating unit 108 may include an inverse function calculation unit 1081. The inverse function calculation unit 1081 calculates an inverse function of the input-output function obtained from the second correction images. From the inverse function, correction data are generated by the correction data generating unit 108.

A display unit 110 may be controlled by a non-illustrated display control unit included in the radiation control apparatus 11, in order to display a radiation image corrected by the correction data.

Figure 2A:
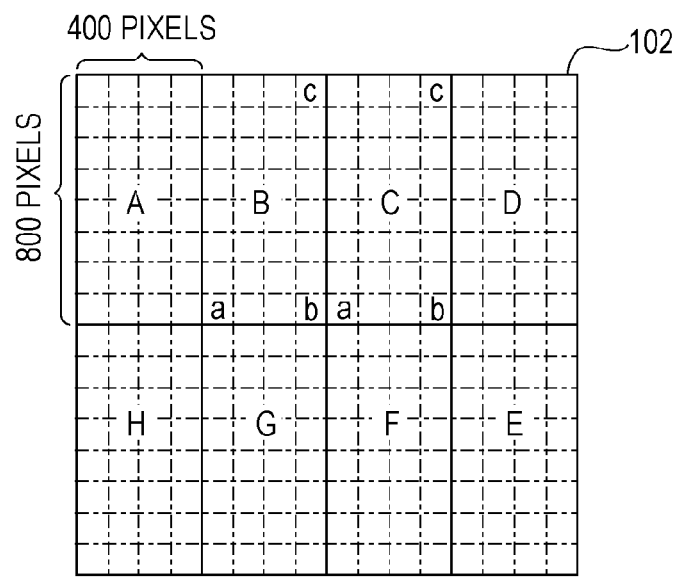
FIG. 2A is a view of an image sensor and regions of interest (ROIs) for calculating an average value of the pixel values.

FIG. 2A is a view of an image sensor and the regions of interests (ROIs) for calculating an average value of the pixel values, in accordance with one embodiment. The image sensor in the X-ray detection unit 12 of the illustrated embodiment has 8 plates of solid-state image sensing devices. Each device has 400 pixels in row and 800 pixels in column. Each device is manufactured in a similar manner (the same process) and is expected to have substantially the same response to X-ray radiation. The devices are tiled to configure a 2-dimensional image sensor.

In the illustrated embodiment of FIG. 2A, each region of interest (ROI) has 100 pixels in row and 100 pixels in column. The boundary of each ROI is illustrated with the dashed-dotted lines. Any alternative size of the ROI can be applied as far as the ROI of the lowest sensitivity can be detected. The calculation unit 1061 calculates an average value of the output values from the pixels in each ROI for every correction image.

Figure 2B:
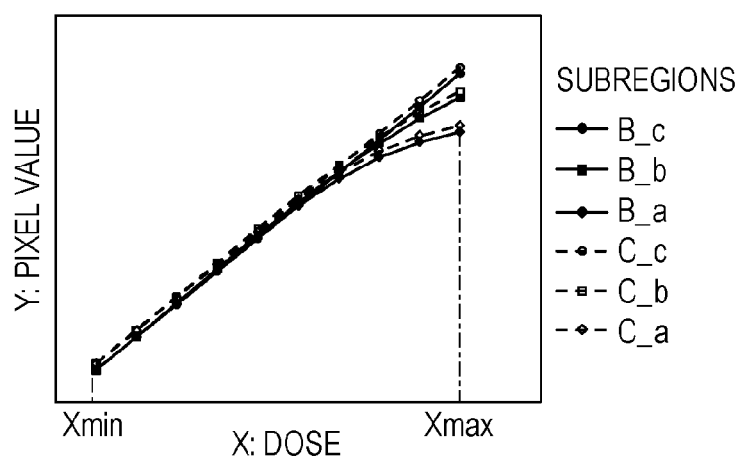
FIG. 2B is a graph generally representative of a relationship between pixel values of each ROI and the dose value of radiation detected at each ROI, in accordance with one embodiment.

FIG. 2B is a graph generally representative of a relationship between pixel values of each ROI and the dose value of radiation detected at each ROI, in accordance with one embodiment. The characteristic functions in FIG. 2B are acquired by the characteristic acquisition unit 106. FIG. 2B shows the approximated input-output function of 6 ROIs. The 6 ROIs are area a, b and c in device B (shown in FIG. 2B as "B_a, B_b and B_c") and area a, b, and c in device C (shown as "C_a, C_b and C_c"). Here all the 6 ROIs are located at the corner, because the pixels at the corner or at the boundary are susceptible to unevenness of sensitivity. In one embodiment, the ROI selection unit 1071 compares only the ROIs around the edges of each device, which reduces the time of the dose determination process. In the illustrated embodiment the area B_a or the area C_a indicate the lower sensitivity at the high dose range, and start to be saturated at the lower dose value.

And according to FIG. 2B, for example B_a and C_a, the input-output characteristics are similar to each other. In the illustrated embodiment, 10 times of X-rays are emitted and 10 correction images (first correction images) are obtained by the characteristic acquisition unit 106. Here Xmin is the allowable smallest dose value in a dose range where the input-output function shows linearity. Xmax is the allowable largest dose value for a predetermined subject (e.g., a human body or region thereof), which may be determined by a radiation technologist or the medical agency. From Xmin to Xmax the dose increase amounts of the dose values are substantially the same.

Because each device is manufactured by substantially the same process, the ROIs at the same location of the devices are expected to have similar characteristics. In light of this consideration, the ROI selection unit 1071 in the illustrated embodiment sets the ROIs so that locations of ROIs in one device fit the locations of the ROIs in any of other devices. And the ROIs do not extend across two or more devices. Naturally, for this consideration, it is assumed that the entire surface of the radiation sensor is irradiated uniformly with the same radiation dose, so that each device is expose to radiation in the same manner.

In one embodiment the characteristic acquisition unit 106 acquires for only one of the devices, and the ROI selection unit 1071 selects a ROI from the ROIs in that device. This makes the process much simpler and more efficient.

Figure 2C:
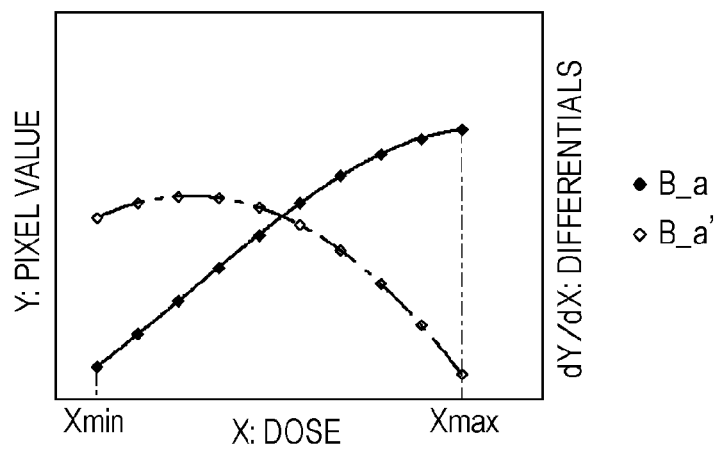
FIG. 2C is a graph generally representative of a function indicating a relationship of ROI "B_a" approximated by polynomials and a differential function, in accordance with one embodiment.

FIG. 2C is a graph generally representative of a function indicating a relationship of ROI "B_a" approximated by polynomials and the differential function, in accordance with one embodiment. In the illustrated embodiment "B_a" is selected by the ROI selection unit 1071. The approximated input-output function is calculated by the approximation unit 1062 using polynomial approximation. In the illustrated embodiment the function is approximated by the cubic function. The derivative function is also calculated by the derivative calculation unit 1072. The derivative function indicates the rate of increase of a pixel output value at each dose value.

Figure 3:
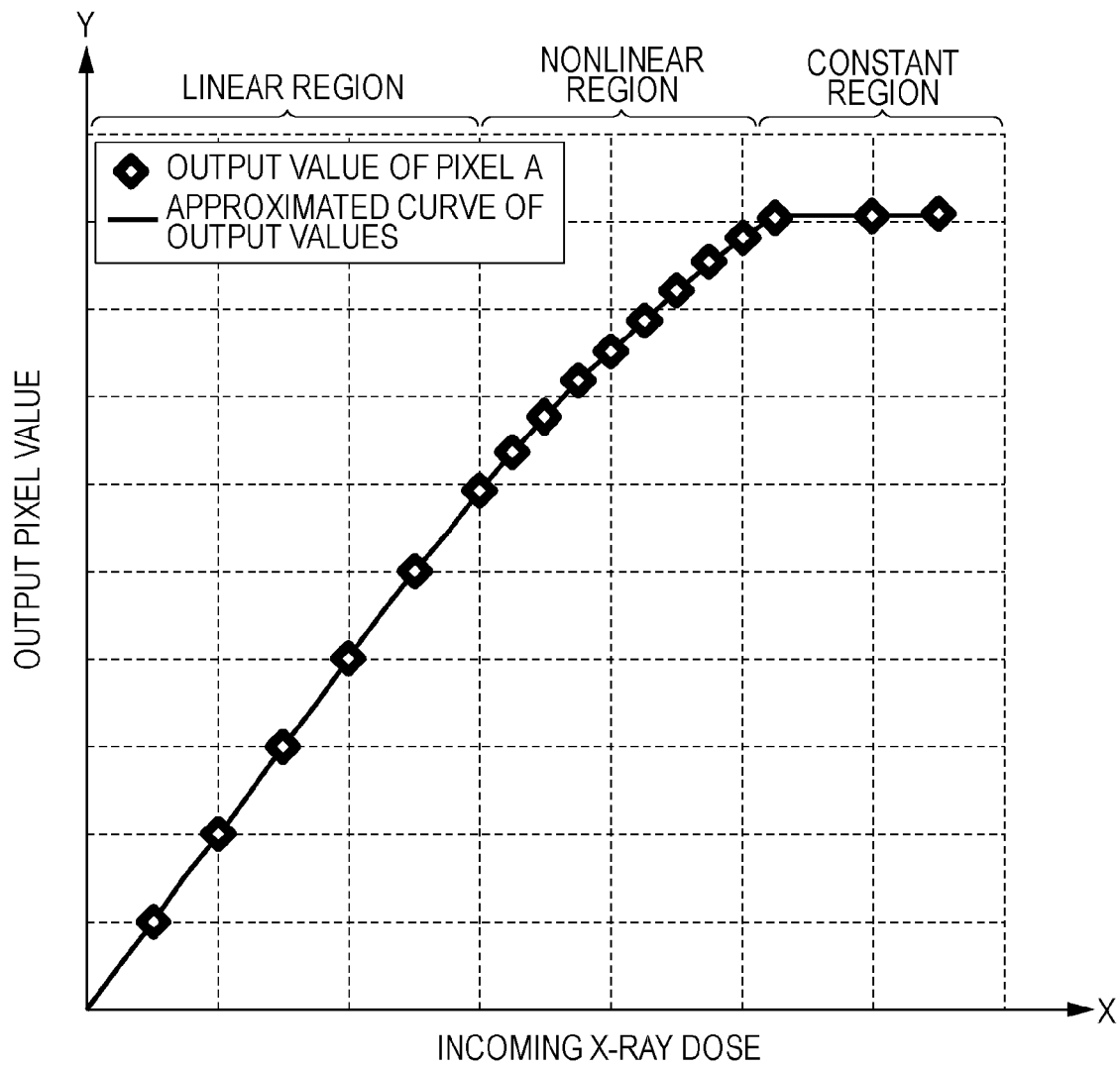
FIG. 3 is a graph generally representative of another approximated function indicating a relationship between incoming X-ray dose and output pixel values, in accordance with one embodiment.

In an alternative embodiment, the approximation unit 1062 uses a plurality of functions to approximate the input-output function. In FIG. 3, the input-output function is divided into 3 sections which are lower dose range, middle dose range and higher dose range.

In the lower dose range, in which the input-output function shows linearity, the input-output function is approximated by linear function (LINEAR REGION). In the middle dose range, in which the input-output function starts to be saturated but does not show constant, the input-output function is approximated by nonlinear function (NONLINEAR REGION), for example a quadratic function or a cubic function. In the higher dose range, in which the input-output function shows no response to the increase of dose value, the input-output function is approximated by a constant function (CONSTANT REGION).

This method precisely approximates the nonlinear input-output function in middle dose range. By utilizing the correction data obtained from the approximated function the gain correction processing can be made more precise than in conventional methods.

Using the derivative function of the input-output function the dose values for obtaining the correction images (second correction images) are determined by the dose determination unit 107. In the dose range where the rate of increase is relatively small, which indicates the input-output function starts to be saturated, many correction images for the approximation of the input-output function is desired. Therefore, the increase amounts of dose values should be small. In this manner the dose values are determined by using the derivative function of the input-output function.

Figures 4A, 4B:
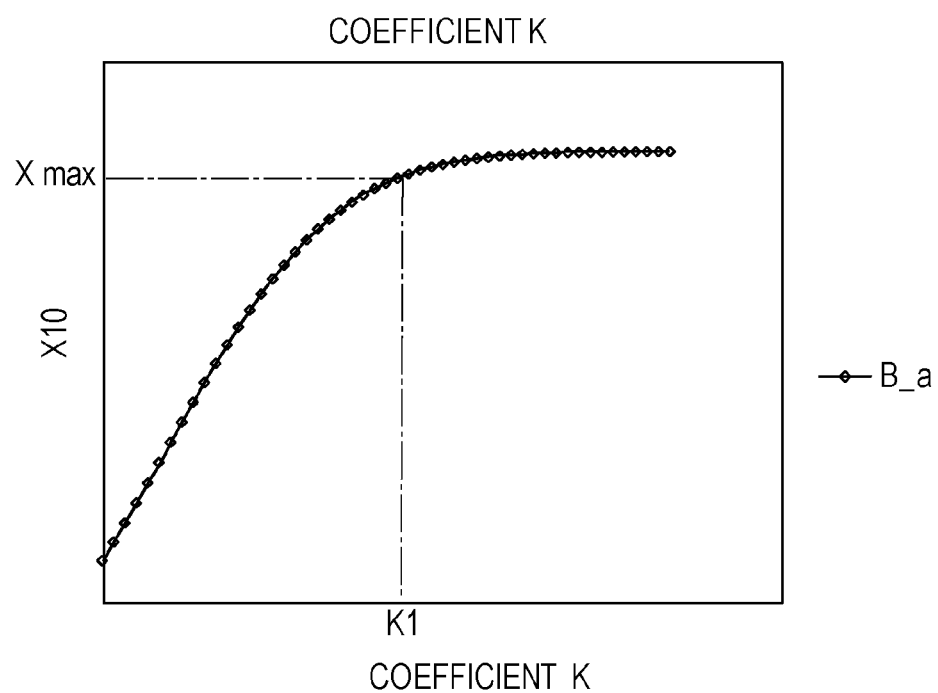
FIG. 4A is a function for determining dose values of radiation for acquiring calibration data, in accordance with one embodiment.
FIG. 4B is a graph generally representative of a function for determining the dose values, in accordance with one embodiment.

A function of dose value determination of one embodiment is shown in FIG. 4A. In the function parameter Xn is n-th dose value for obtaining n-th second correction image. X1 is the smallest dose value. X1 may be determined as the allowable smallest dose value Xmin in the dose range where the input-output function shows linearity.

In the function the dose value Xn is increased in proportion to the differentials of input-output function Y. Constant K is the proportional coefficient. Constant K is determined so that the maximum value of Xn corresponds to the allowable maximum dose value Xmax. In one embodiment the number of the second correction images or the emission of X-rays n are ten, K is determined so that the X10 equals Xmax.

The coefficient determination unit 1073 calculates X10 as the function of K, as shown in FIG. 4B. On the condition that X1 equals Xmin and X10 equals Xmax, K can be determined, shown by the dashed-dotted line in FIG. 5B. The dose determination unit 107 determines the dose values from X1 to X10, by the function shown in FIG. 5A. The determined dose values are input to the imaging control unit 105. Imaging control unit 105 generates the imaging condition and the imaging condition is input into the X-ray generation unit 13 and X-ray detection unit 12. The dose control unit 103 controls the X-ray generation unit 13 so that the dose values from X1 to X10 are sequentially generated. The image sensor 102 detects the X-rays to obtain the second correction images corresponding from X1 to X10.

Figure 5A:
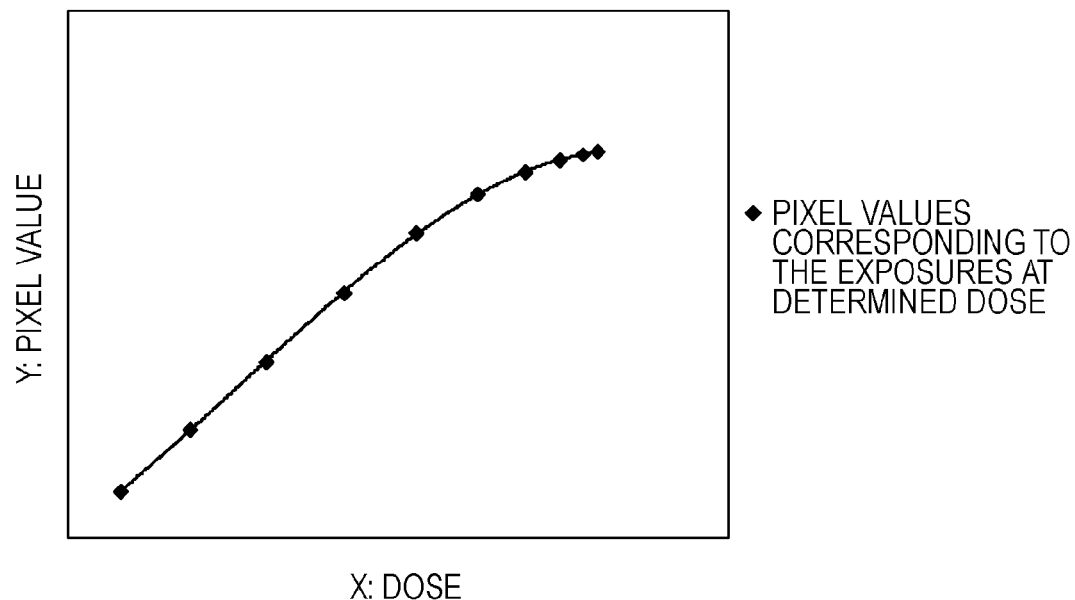
FIG. 5A is a graph representative of a pixel value as an approximated function of a dose value, generated by the data acquired by the determined dose, in accordance with one embodiment.

The second correction images are input into the characteristic acquisition unit 106, and the second input-output function is acquired for each of the pixels or groups thereof (e.g., each sensor device) in the image sensor 102. One of the input-output function is shown in FIG. 5A. Comparing FIG. 5A with FIG. 2C which shows a first calculated input-output function, more correction images are obtained at higher dose range, therefore, the second input-output characteristic is more accurate.

Figure 5B:
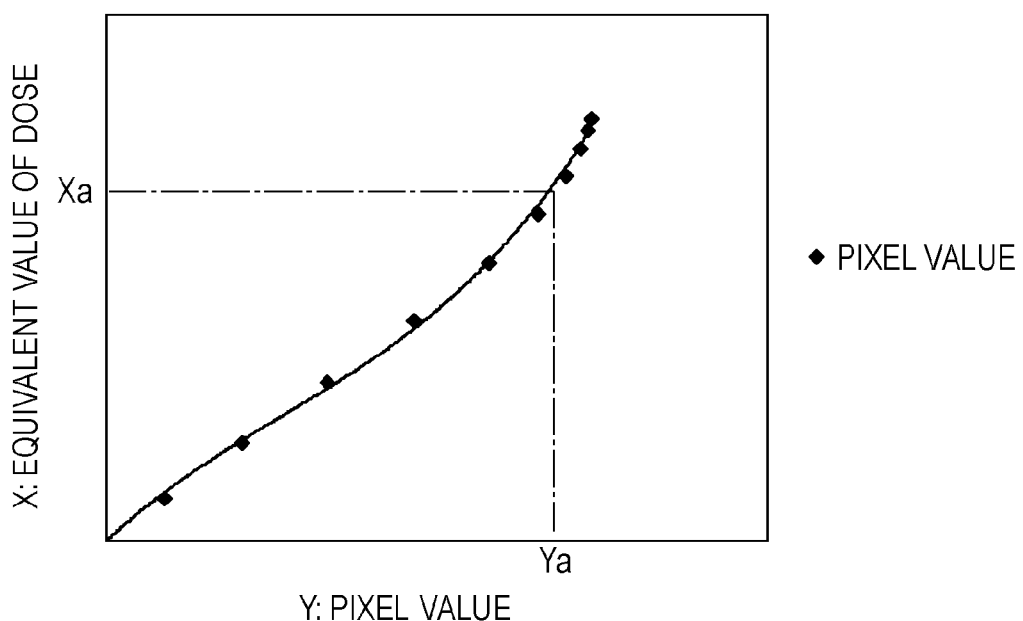
FIG. 5B is a graph representative of an inverse function of the approximated function, which indicates a correction data, in accordance with one embodiment.

The inverse function, calculated by the inverse function calculation unit 1081 is shown in FIG. 5B. By the inverse function equivalent value of dose can be obtained from the pixel value of each pixel.

Then, the unevenness of sensitivity in the entire detector can be corrected by the inverse function. In the illustrated embodiment (FIG. 5B), inverse function is approximated by the cubic function. The y-intercept of the inverse function is set to 0 for zero pixel value corresponds to 0 equivalent value of dose. The inverse function is $X = aY^3 + bY^2 + cY$, and the a, b and c is the stored on memory value as the correction data for a pixel.

Figure 6C:
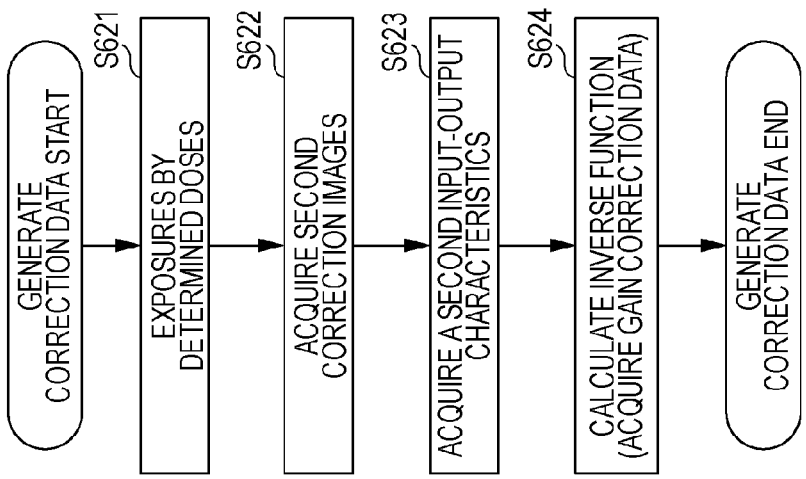
FIG. 6C is a flowchart of a sub-process of the calibration process for generating a calibration data, in accordance with one embodiment.

The method for performing the calibration process of one embodiment is described below with reference to FIG. 6A. In step S61 the radiation control apparatus 11 optimizes dose values for obtaining correction data, based on the input-output characteristic of the image sensor 102. In step S62, the radiation control apparatus 11 controls the X-ray detection unit 12 and the X-ray generation unit 13 so that the correction images are obtained corresponding to the determined dose values. And the radiation control apparatus generates the correction data for unevenness of sensitivity based on the correction images.

In one embodiment 2 sets of correction images are obtained from the radiation imaging system. In the first set of correction images the increase amounts of the dose values are equal. From the first set of correction images the first input-output characteristic is acquired.

In the second set of correction images the increase amounts of the dose values are determined based on the first input-output characteristics. The second input-output characteristic calculated from the second set of correction images is more accurate than the first one.

Figure 6B:
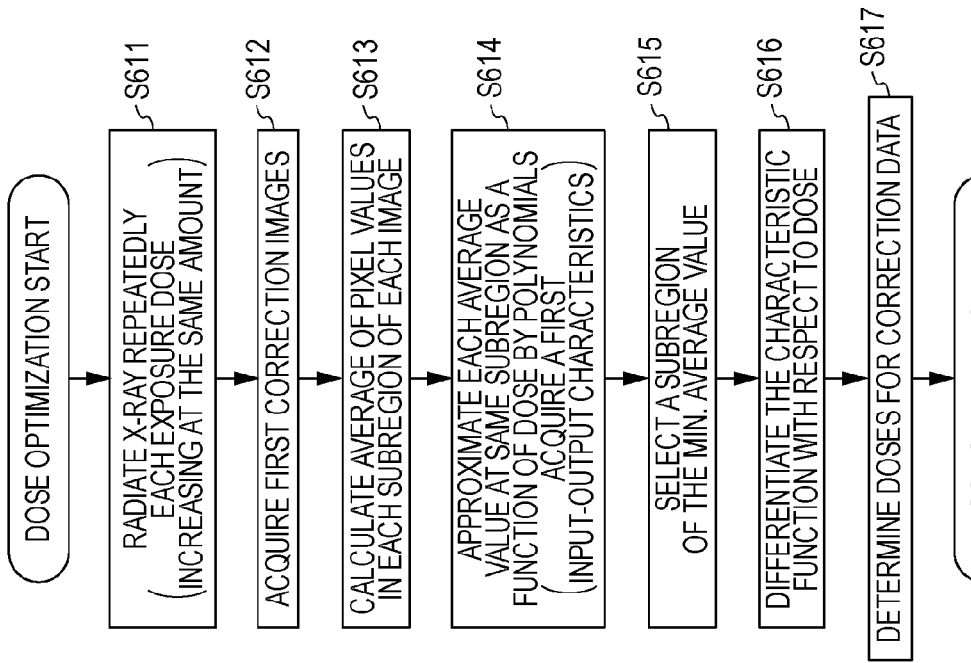
FIG. 6B is a flowchart of a sub-process of the calibration process for optimizing a dose for acquiring calibration data, in accordance with one embodiment.
Figure 6A:
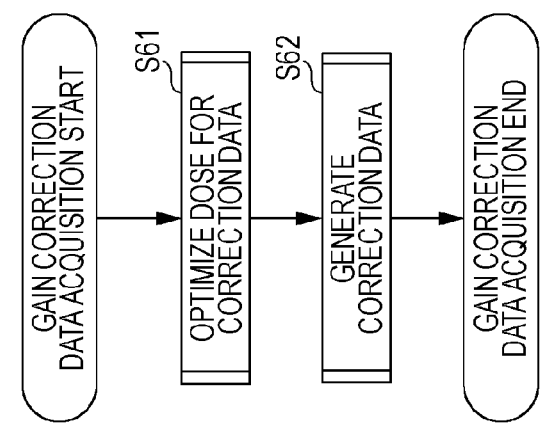
FIG. 6A is a flowchart of a process for performing a calibration process in accordance with one embodiment.

A dose optimization process of one embodiment is shown in FIG. 6B.

In step S611 the dose control unit 103 controls the X-ray generation unit 13 to radiate X-ray repeatedly, for example ten times. The X-ray detection unit 12 obtains the first set of correction images, under the control by the imaging control unit 105. The emissions of X-rays by the X-ray generation unit 13, and the charge accumulation and the readout by the X-ray detection unit 12 are synchronized. In one embodiment each dose value for first set of correction images increases at the same amount. Using the dose values having equal increase amounts, the accuracy of the second input-output characteristic improves.

In step S612 the radiation control apparatus acquires the first set of the correction images. The images are transmitted to the characteristic acquisition unit 106 and the dose determination unit 107.

In step S613 the calculation unit 1061 in the characteristic acquisition unit 106 calculates the average value in each of the ROI in each of the first set of the correction images.

In step S614 the approximation unit 1062 approximates the input-output characteristic for each ROI by using polynomials. The average values calculated in step S613 is used as output values. The first input-output characteristic is acquired.

In one embodiment process from step S611 to step S614 can be performed only one time in the manufacturing factory or at the installation of the system in the medical agency. The calibration process performed periodically after the installation starts from the step S615.

In step S615 the ROI selection unit 1071 compares the output values corresponding to the maximum dose value (Xmax) in ROIs. The ROI selection unit 1071 selects an ROI whose output value corresponding to the Xmax dose value is the smallest in all the ROIs. In the selected ROIs the input-output characteristic starts to be saturated at the smallest dose value in all the ROIs. Generally the increase rate of the output pixel values decrease as the pixels in the image sensor starts to be saturated.

In step S616 derivative calculation unit 1072 calculates the differential function of the input-output characteristics of the selected ROI, as shown in FIG. 2C.

In step S617 coefficient determination unit 1073 determines a coefficient based on the differential function. The coefficient is used for determining the dose values for the second set of the correction images by the dose determination unit 107.

The correction data generation process of one embodiment is shown in FIG. 6C.

In step S621 repeated exposures to radiation of the X-ray detection unit 12 is performed. The dose values are determined by step S61. The second set of correction images are obtained by the X-ray detection unit 12.

In step S622 radiation control apparatus 11 acquires the second set of correction images. The second set of correction images are transmitted to the characteristic acquisition unit 106 and the correction data acquisition unit 108.

In step S623 characteristic acquisition unit 106 acquires the input-output characteristic for each of the pixels in the image sensor 102. The approximation unit 1062 approximates the each of the characteristic functions by polynomials, for example a cubic function.

In step S624 the correction data acquisition unit 108 acquires a set of gain correction data by calculating the inverse function of the input-output characteristic function for each of the pixels.

Another dose optimization process of one embodiment is shown in FIG. 7. In this process the input-output characteristic is approximated by the three functions including a linear function, a non-linear function and a constant function. The description on steps S711-S713 is skipped because the processes in the steps are similar to steps S611-S613.

In step S714, the approximation unit 1062 approximates the input-output characteristic of each ROI by a linear function at the lower dose range, by a non-linear function at the middle dose range, and by a constant function at the higher dose range. Using the known technique the three functions are fitted to the input-output characteristic. By the approximation the first input-output characteristic function of each ROI is acquired.

In step S715, the ROI selection unit 1071 selects a ROI in which the non-linear function is fitted to the widest range of non-linear function in all the ROIs. In alternative embodiment the ROI selection unit 1071 selects a ROI where the differentials of the fitted non-linear function is the smallest in all the ROIs.

In step S716, the dose determination unit 107 determines the dose values so that the increase amounts of the dose values are smaller in the dose range where the non-linear function is fitted, than those in the other dose ranges. This leads to the precise correction especially to the pixel values corresponding to the non-linear input-output characteristic.

In still another embodiment ROI the dose determination unit 107 obtains the minimum dose value of the nonlinear dose range in all the ROIs and the maximum dose value of the nonlinear dose range in all the ROIs. And the determination unit 107 determines the dose value so that the increase amounts of the dose values are smaller in the dose range from the minimum and the maximum dose value. This provides the precise correction to the pixel values in all the ROIs corresponding to non-linear input-output characteristic.

Figure 8:
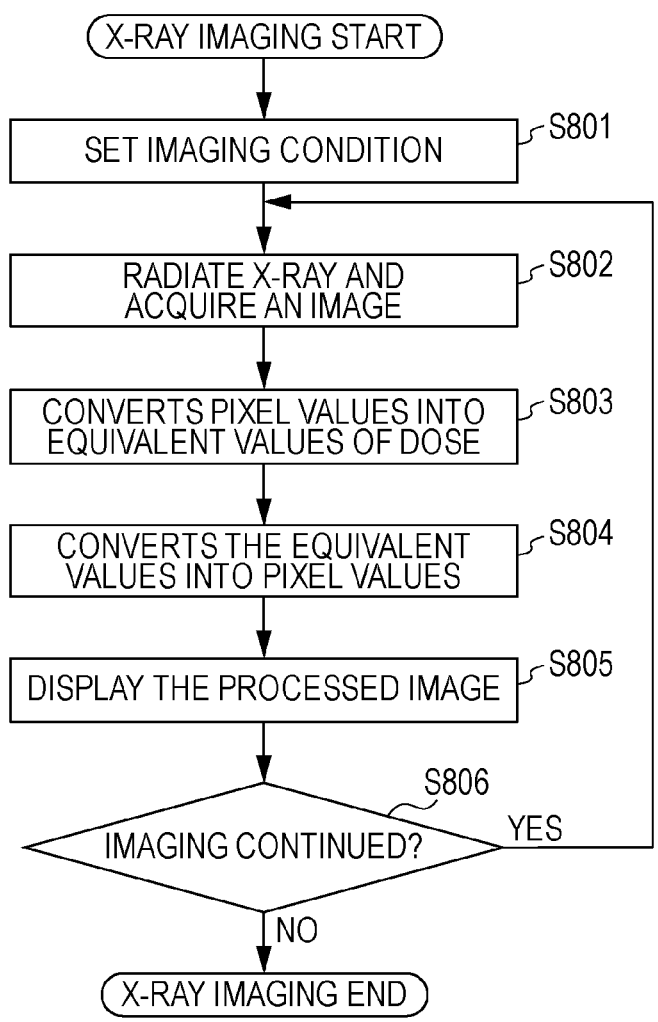
FIG. 8 is a flowchart of a process for operating a radiation imaging system in accordance with one embodiment.

The X-ray imaging operation of one embodiment is shown in FIG. 8.

In step S801, the condition setting unit 105 set an imaging condition input by operator via the operation unit 111. For calibration processing imaging condition may be output from the dose determination unit 107.

In step S802, the imaging condition unit 105 transmits a signal to the dose control unit 103 for specifying a dose value. The dose control unit 103 outputs an instruction signal to the X-ray generation unit 13 for radiate X-ray. The X-ray generation unit 13 radiates X-ray. In synchronizing with the radiation, imaging control unit 105 gives an instruction signal to the X-ray detection unit 12 for obtaining X-ray detection. The X-ray detection unit 12 obtains the X-ray image and transmits the X-ray image to the image correction unit 109.

In step S803, the image correction unit 109 corrects the X-ray image using the gain correction data. Since the gain correction data indicates the relationship between the pixel value and the equivalent value of dose, the image correction unit 109 converts each of the pixel values into the equivalent value of dose.

In the illustrated embodiment in FIG. 5B, the gain correction data are stored on the memory as the coefficients of the cubic function.

The pixel value Ya is converted into the pixel value Xa.

In step S804, the image correction unit 109 multiplies each of the equivalent dose of values by a predetermined constant value. The constant value is the gain factor.

In step S805, the radiation control unit 11 outputs the processed X-ray image to the display unit 110.

In step S806, in accordance with the input by the operator the radiation control apparatus 11 determines to perform another imaging.

Operator instructs to perform another imaging cycle or finish the imaging process by touching buttons for each of the instructions. When the operator decides to continue (repeat) imaging, the process in steps S805-S805 is performed. When the operator decides to finish the imaging process, an END instruction is provided at step S806, and imaging operation is finished.

As described above, the dose values for obtaining correction data is optimized based on the input-output characteristic of the image sensor, and the artifact in image due to the gain correction processing can be suppressed.

Figure 9:
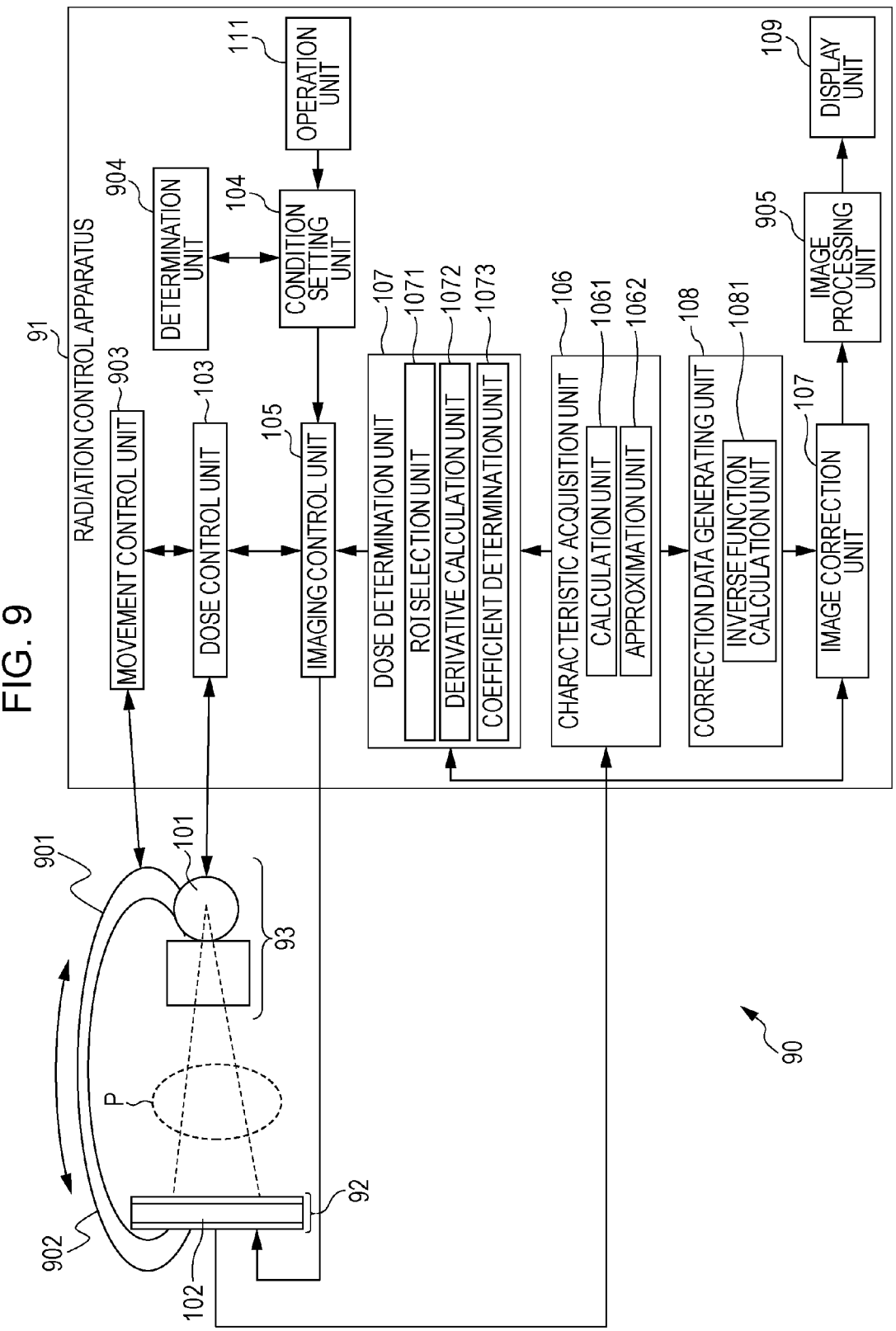
FIG. 9 is a diagrammatical overview of another radiation imaging system including c-arm apparatus in accordance with one embodiment.

The radiation imaging system of another embodiment is shown in FIG. 9. The radiation imaging system is a C-arm system, including C-arm apparatus in which the X-ray detection unit 92 and the X-ray generation unit 93 are fixed in the relative position with the C-arm 902. The C-arm 902 is rotatable around the subject. The rotation is controlled by the movement control unit 903 in a radiation control unit 91.

The radiation control unit 91 also includes a determination unit 904, which configures to determine for each imaging whether first correction data for a high dynamic range mode or second correction data for a low dynamic range mode is used.

In high dynamic range mode, relatively high dose X-rays are emitted and detected by the X-ray detection unit 92. So the radiation image should be precisely corrected in the high dose range. The pixels in the image sensor 102 are likely to be saturated. The correction data for the nonlinear input-output characteristic is desired. On the other hand in the low dynamic range mode, detected dose range is likely to be relatively low, in which the input-output characteristic shows linearity. The correction data is not necessarily precise.

In the light of this point the determination unit 904 changes the correction data used in the high dynamic range mode and in the low dynamic range mode. For high dynamic range mode the first correction data is generated based on the input-output characteristic approximated by the nonlinear function. For low dynamic range mode the second correction data is generated based on the input-output characteristic approximated by only the linear function.

A image processing unit 905 applies image processing to radiation images. The image processing includes gradation conversion processing and noise reduction processing. The image processing unit 905 changes applying image processing according to the dynamic range mode.

The description is skipped for the units realizing the same function as the system shown in FIG. 1.

Figure 10:
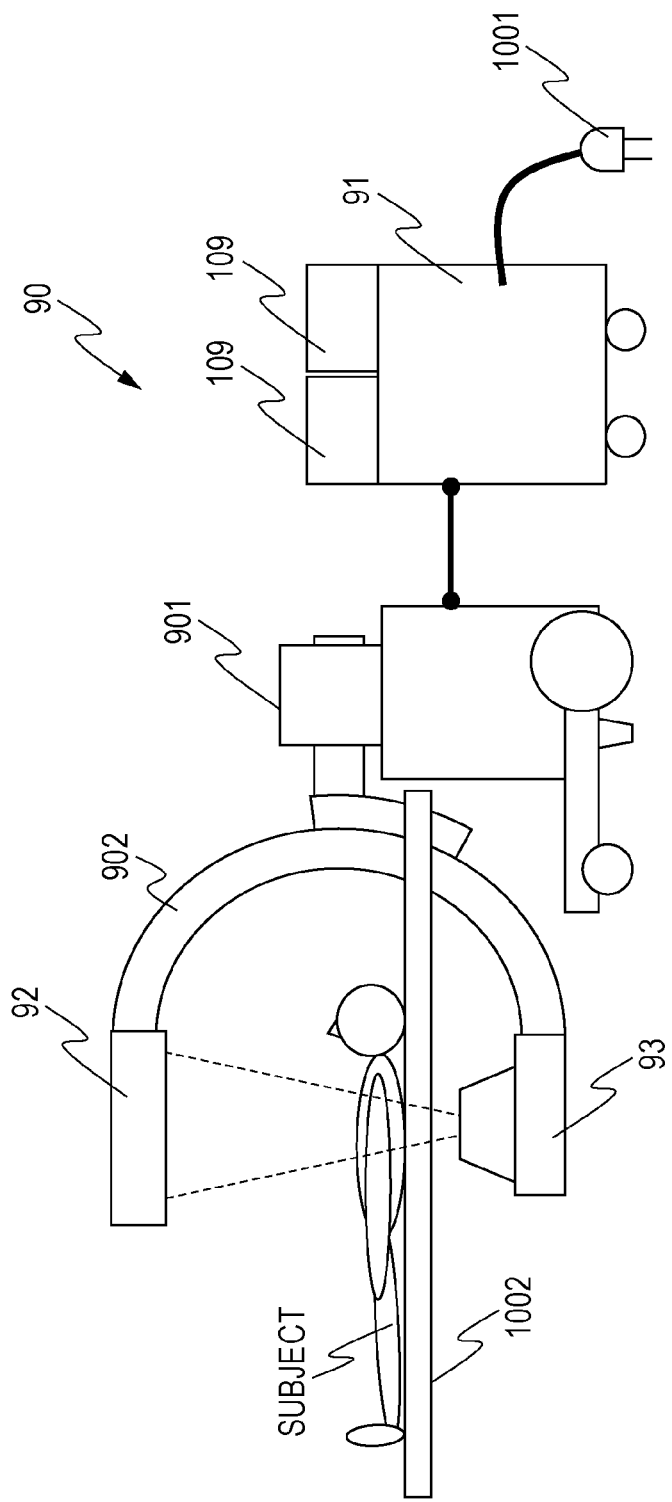
FIG. 10 is a perspective view of a mobile C-arm radiation imaging system in accordance with one embodiment.

FIG. 10 is a perspective view of a mobile C-arm radiation imaging system 90 in accordance with one embodiment. The C-arm radiation imaging system 92 is a mobile C-arm system, including a C-arm apparatus 901 configured to be movable with wheels. The system may move to the desired position for imaging a subject lying on the table 1002, for example. The system can perform both a radiation imaging including a still imaging and fluoroscopy, and a computed tomography using the C-arm 902 rotating around a subject.

The system also includes a monitor cart 91 connected to the C-arm apparatus 901, having a radiation control apparatus and two display unit 109 configured to display the radiation image obtained by the C-arm apparatus 901 and from the extrinsic system via the wireless connection. The Monitor cart 91 acquires electricity via the power plug 1001 and provides electricity to the C-arm apparatus 901.

Figure 11:
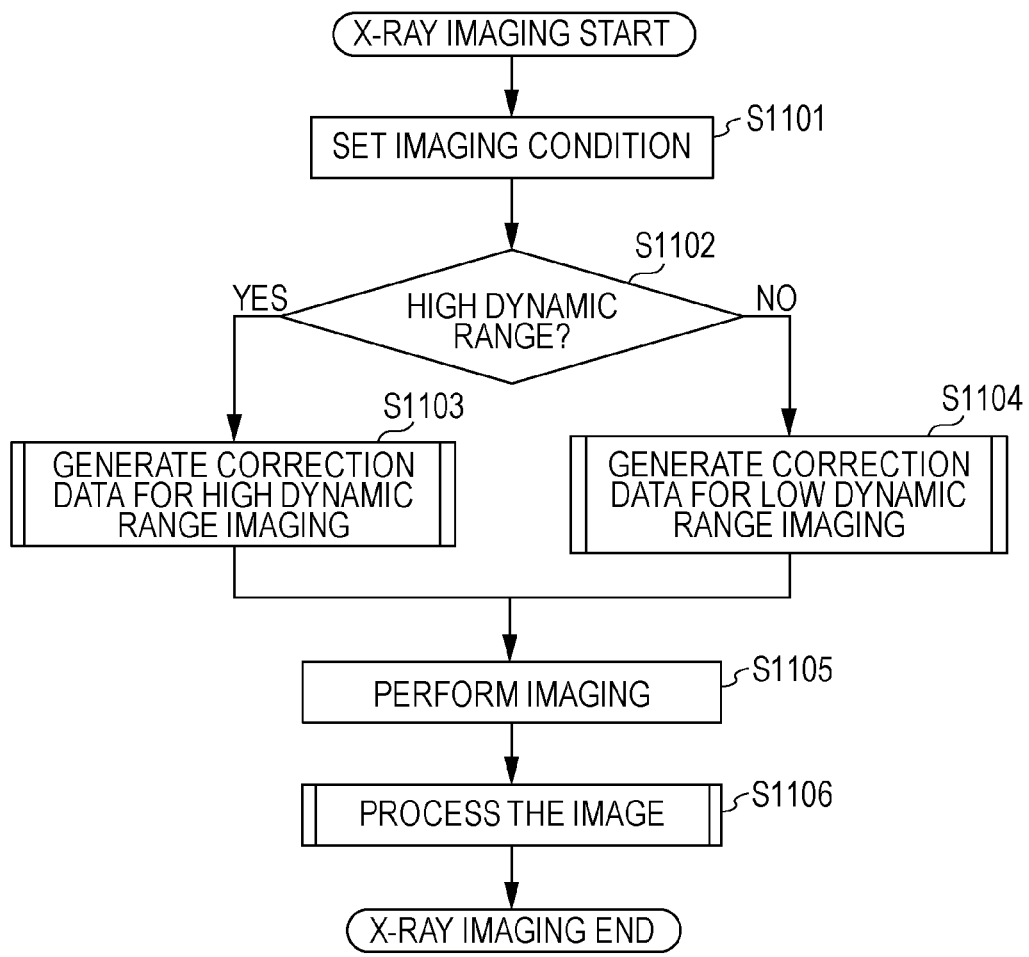
FIG. 11 is a flowchart of another process for operating a radiation imaging system, including selective generation of correction data for images to be acquired, in accordance with one embodiment.

The process of performing another calibration process of one embodiment is shown in FIG. 11.

In step S1101 the condition setting unit 104 set the imaging condition according to the input from the operation unit operated by an operator.

In step S1102 the determination unit 904 determines which of the correction data used in the gain correction processing, according to the imaging mode. In the computed tomography or the digital subtraction angiography, in which relatively high dose is desirable, the first correction data for correct the nonlinear characteristic of the image sensor 102. In the still imaging and the fluoroscopy, in which relatively high dose is not necessarily desirable, the input-output characteristic is approximated by linear function, and the second correction data using the approximated linear function.

In step S1103, radiation control apparatus 91 acquires the first correction data. In one embodiment the dose values are iteratively-determined. A dose value for the n-th correction image is determined from the 1st to the (n−1)-th correction images.

In step S1104, radiation control apparatus 91 acquires the second correction data. In one embodiment one calibration imaging is performed at a single dose value.

In step S1105, radiation control apparatus 91 controls the imaging system 90 to perform imaging according to the imaging mode. This process is substantially the same as that described with FIG. 8.

In step S1106, image processing unit 905 performs image processing in accordance with the imagine mode.

Figure 12B:
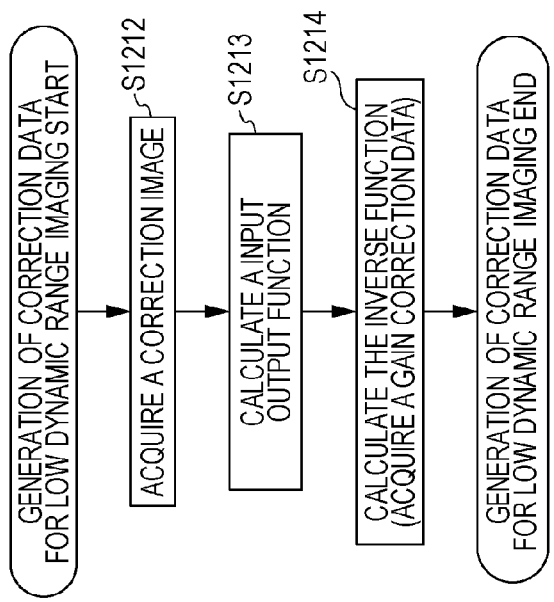
FIG. 12B is a flowchart of a process for generating correction data for low dynamic range imaging mode, in accordance with one embodiment.
Figure 12A:
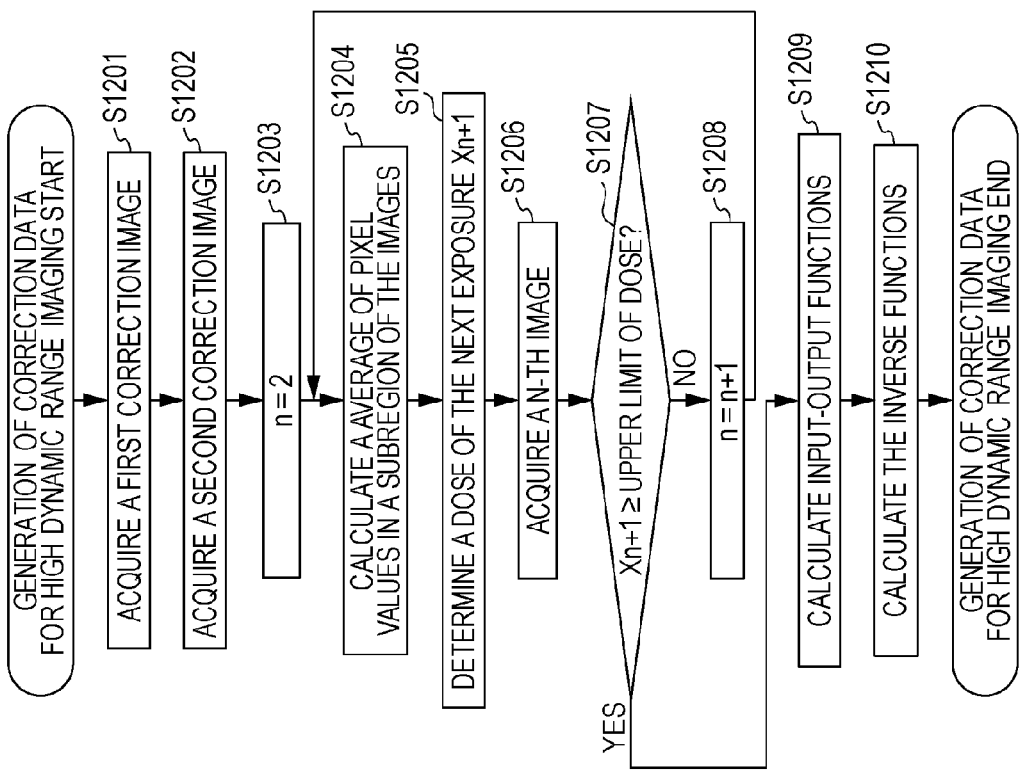
FIG. 12A is a flowchart of a process for generating correction data for high dynamic range imaging mode, in accordance with one embodiment.

A process for acquiring the first correction data for high dynamic range mode in accordance with one embodiment is shown in FIG. 12A. In the illustrated embodiment ten correction images are acquired.

In step S1201 a first correction image is acquired and in step S1202 a second correction image is acquired from the X-ray detection unit 12. In this two correction images the dose values are set different and set as relatively small values. In step S1203 a variable n for counting the number of imaging already performed is substituted by 2.

In step S1204, calculation unit 1061 calculates average value of pixels in a specific predetermined ROI stored on a memory. The specific ROI is determined as the ROI in which the input-output characteristic starts to be saturated in the smallest dose value in all the ROIs. The average value is used as an output pixel value Yn corresponding to the incoming dose value Xn.

Figures 13A, 13B:
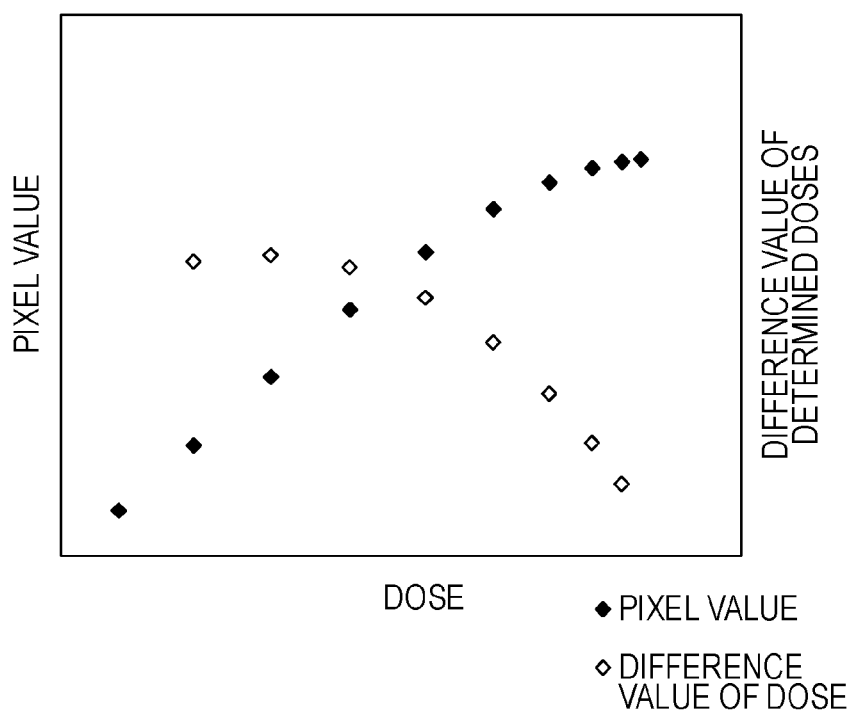
FIG. 13A is another function for determining dose values of radiation for acquiring a calibration data, in accordance with one embodiment.
FIG. 13B is a graph generally representative of another function for determining the dose values, in accordance with one embodiment.

In step S1205, the dose determination unit 107 determines a dose value for the 3rd correction image using an equation shown in FIG. 13A. In the equation dose value $X_{n+1}$ is obtained by adding the Xn which indicates the dose value for n-th the images to the differential value multiplied by coefficient K.

By using the equation the dose values for next correction image is determined by the last two correction images already acquired. This reduces the number of emission of X-rays and also reduces the time of calibration processing.

In step S1206 the (n+1)-th correction image is obtained by the X-ray detection unit 92. The characteristic acquisition unit 106 and the correction data acquisition unit 108 acquires the (n+1)-th correction image.

In step S1207 the dose determination unit 107 determines whether the dose value $X_{n+1}$ exceeds the upper limit Xmax or not. If not, the dose value determination unit 107 substitutes the variable n by n+1 in step S1208. And after that the steps S1204-S1207 are performed. The determined dose values are shown as a graph in FIG. 13B.

If $X_{n+1}$ exceeds the limit, the process goes to step S1209.

In step S1209, the characteristic acquisition unit 106 calculates input-output function for each of the pixels using approximation by a cubic function. In step S1210, the inverse calculation unit 1081 calculates the inverse function of the input-output functions. The first correction data for high dynamic range mode are acquired as the coefficients of the inverse function.

A process for generating the second correction data for low dynamic range mode, in accordance with one embodiment, is shown in FIG. 12B.

In step S1212, a single correction image at a predetermined dose value is obtained by the X-ray detection unit 92. The dose value is included in a dose range in which the input-output characteristic shows linearity.

In step S1213, the characteristic acquisition unit 106 acquires the input-output function for each of the pixels, using each of the output pixel values and an measured dose value by the dosimeter. The characteristic acquisition unit 106 approximates the input-output characteristic function by a linear function $Y=kX$, in which Y represents the output pixel value, X represents the incoming dose value and k represents a coefficient value.

In step S1214 the correction data acquisition unit 108 calculates the inverse function of the input-output characteristic function for each of the pixels. The correction data acquisition unit 108 acquires a coefficient $e=1/k=X/Y$. The coefficient e for each of the pixels is stored on a memory as the second correction data, which indicates the relationship between the output pixel value and the detected dose value.

In the low dynamic range mode, the range of incoming dose values is relatively low and is included in the range where the input-output characteristic shows linearity. In the light of the feature, the calibration processing for the low dynamic range mode in accordance with the illustrated embodiment reduces process time with keeping the accuracy of the correction.

Figure 14B:
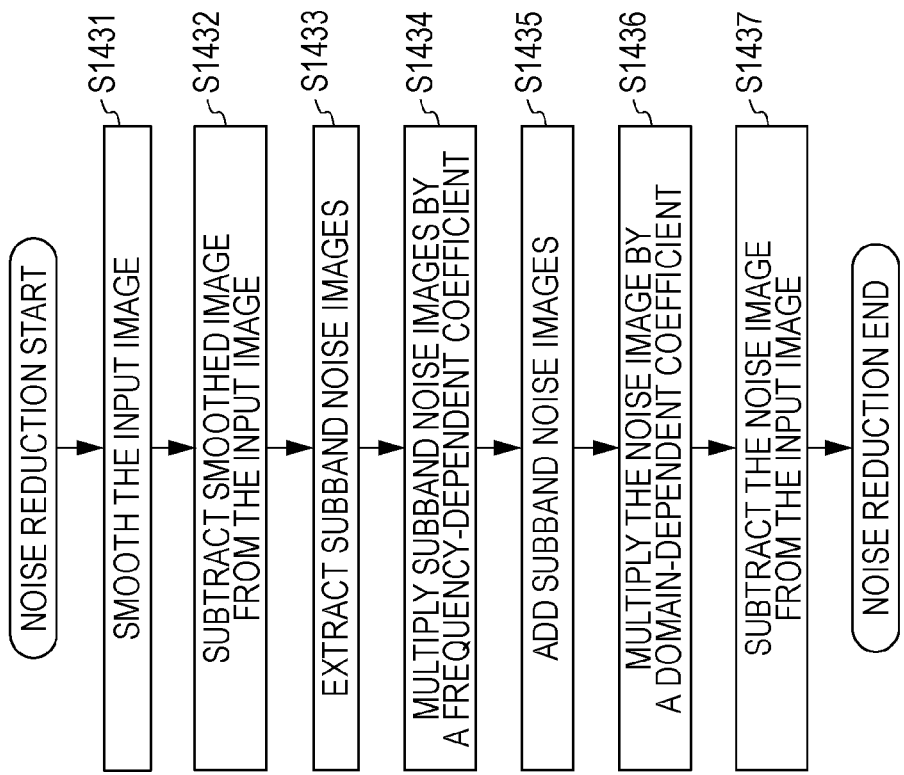
FIG. 14B is a flowchart of a sub-process of the image processing, for noise reduction, in accordance with one embodiment.
Figure 14A:
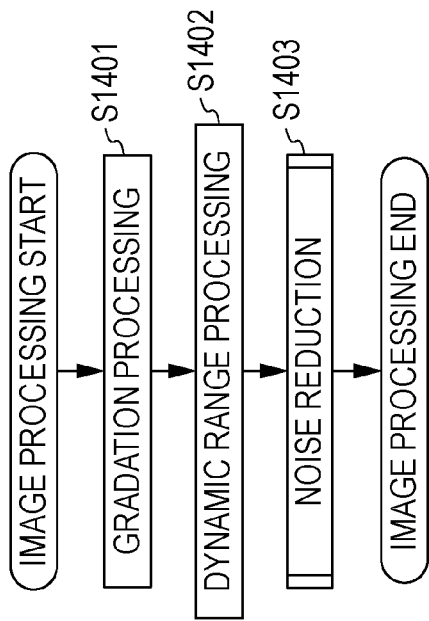
FIG. 14A is a flowchart of radiation image processing in accordance with one embodiment.

A process for a radiation image according to the imaging mode, in accordance with one embodiment, is shown in FIG. 14A.

In step S1401, the image processing unit 905 applies the gradation conversion processing to the corrected radiation image using the S-shaped curved conversion function so that the contrast in a specific pixel value range is improved. In step S1402, the image processing unit 905 applies the dynamic range conversion processing to the radiation image.

In step S1403, the image processing unit 905 applies the noise reduction processing to the radiation image. A nose reduction processing in accordance with one embodiment is shown in FIG. 14B. In the illustrated embodiment equations shown in FIG. 15 is used to reduce the noise of the image. In the equations Sproc represents a noise-reduced image, Sorg represents a original image, Sus represents a smoothed image of the original image. F represents a function for extracting noise data, alpha_n represents a frequency-dependent coefficient which ranges from 0.0 to 1.0, gamma_ijk represents a domain dependent coefficient. n represents a smoothing level, i & j represents the position of the ROI, and k represents a dose level.

In step S1431 the image processing unit 905 smoothes the original image for each smoothing level n. In step S1432 the image processing unit 905 obtains a high-frequency image by subtracting the smoothed image from the original image.

In step S1433 the image processing unit 905 extracts the noise component by the function F. In step S1434 the image processing unit 905 multiplies each of the extracted noise components by the frequency-dependent coefficient alpha_n.

In step S1435 the image processing unit 905 adds the processed noise components. In the step S1436 the image processing unit 905 multiplies the added noise component by the domain-dependent coefficients gamma_ijk for each of the ROIs, which is used in acquiring the correction data.

In a ROI where the input-output characteristic starts to be saturated at relatively small dose value, the noise included in the gain-corrected image in the large pixel value areas is relatively low, compared with other ROIs. For the ROI, if the pixel values are relatively large, the coefficient gamma_ijk is set to relatively a small value.

In accordance with the input-output characteristic of each ROI and the dose values each of the ROI detects, the coefficient gamma_ijk is determined so that the noise values are maintained in each of the ROIs whose output pixel values may be different. This makes the noise reduction processing more accurate.

Other Embodiments

Embodiments of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s).

Figure 16:
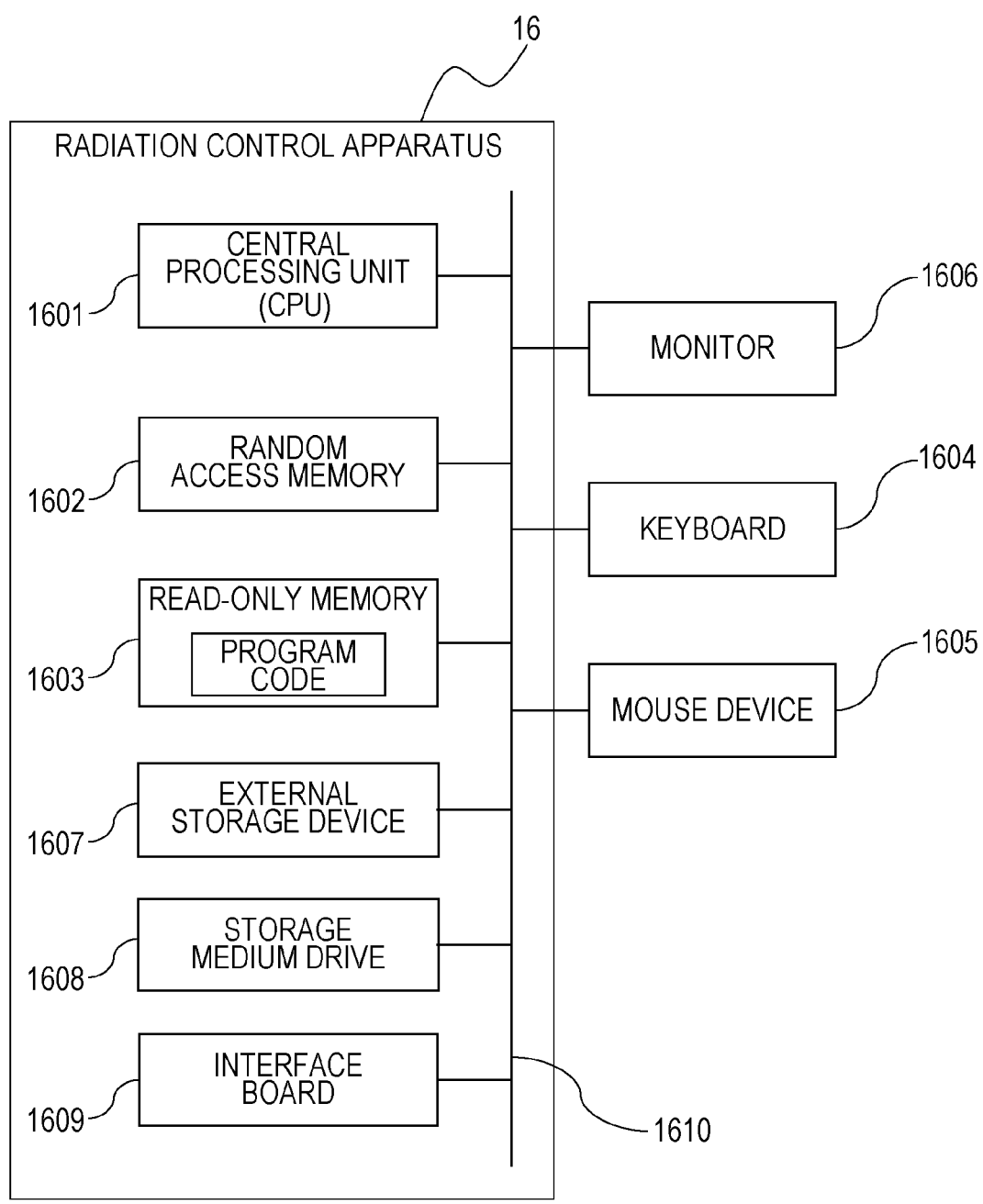
FIG. 16 is a block diagram of a processor-based device or system that may be configured to implement functionality described herein in accordance with one embodiment.

FIG. 16 is a block diagram of a processor-based device or system that may be configured to implement functionality described herein in accordance with one embodiment. The radiation control apparatus 16 includes at least one central processing unit (CPU) 1601 configured to read the program code in accordance with the process of the embodiments stored in the read-only memory 1603, and to extract instructions on the random access memory (RAM) 1602. The CPU 1601 executes the instructions to realize the process of the embodiment. The radiation control apparatus 16 includes an external storage device 1607 configured to store the radiation images, the correction images and the correction data etc. The radiation control apparatus 16 includes an interface board 1609 configured to communicate with the X-ray detection unit and the X-ray generation unit. The radiation control apparatus 16 also includes a storage medium drive 1608 and connects to a monitor functioned as a display unit 1606, and keyboard 1604 and the mouse device 1605 or a touch panel functioned as a operation unit 111.

For this purpose, the program is provided to the computer for example via a network or from a recording medium of various types serving as the memory device (e.g., computer-readable medium).

In other embodiments, the radiation control apparatus controls the display unit to display the determined dose values to notify the operator of the values, and the operator instructs the emission of the X-rays at the determined dose values.

In still other embodiments, radiation other than X-ray, for example alpha-rays, beta-rays, or the gamma-rays is used to obtain the image of a subject.

The embodiments include a calibration process or control apparatus for calibration process of an imaging device using a visible light or the narrow band light, for example, a fundus camera or an endoscope.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161430, filed Jul. 23, 2011, which is hereby incorporated by reference herein in its entirety.

What is claimed is:

1. A radiation control apparatus comprising:
a determination unit configured to determine dose values of radiation generated by a radiation generation unit and irradiated onto a radiation detector which acquires radiation images, the dose values corresponding to measured input-output characteristics of the radiation detector; and
an acquisition unit configured to acquire correction data for the measured input-output characteristics of the radiation detector, the correction data based on the images acquired from the radiation detector exposed to the radiation at the determined dose values,
wherein the determination unit determines the dose values to acquire the correction data such that an interval of doses of radiation irradiated onto the radiation detector is smaller as an increase amount of a pixel value is smaller in a range where the pixels of the radiation detector start to be saturated.

2. The radiation control apparatus of claim 1, wherein the determination unit determines the dose values so that the dose values increases at smaller value in a dose range where a increase rate of an output value of the radiation detector with respect to a incoming dose value are smaller than in a dose range where the increase rate are relatively large.

3. The radiation control apparatus of claim 1, wherein the determination unit determines the dose values so that the dose values increases at smaller value in a dose range where the input-output characteristics are approximated by a linear function, than in a dose range where the input-output characteristics are not approximated by a linear function.

4. The radiation control apparatus of claim 1, wherein the acquisition unit acquires, corresponding to the imaging condition, the correction data by approximating the input-output characteristics by a nonlinear function.

5. The radiation control apparatus of claim 1, wherein the determination unit determines to perform a first correction data generation process which iteratively determines the dose values and use the dose values, or a second correction data generation process which only uses predetermined dose values.

6. The radiation control apparatus of claim 1, wherein the acquisition unit acquires a first input-output characteristics indicating relationship between incoming dose values and output values of the radiation detector, based on the correction images at different dose values, and
wherein the determination unit determines the dose values based on the first input-output characteristics.

7. The radiation control apparatus of claim 6, wherein the acquisition unit acquires a first input-output characteristics for a plurality of subregions in an image sensor in the radiation detector,
wherein the determination unit determines the dose values based on the input-output characteristics in a specific subregion, and
wherein the acquisition unit further acquires correction data from a second input-output characteristics from another correction images acquired at determined dose values.

8. The radiation control apparatus of claim 7, wherein the radiation detector includes a plurality of rectangle-shaped solid image sensing devices tessellated, and
wherein the subregions are set so that each of the region does not include two or more of the solid image sensing devices.

9. The radiation control apparatus of claim 7, further comprising:
an image processing unit configured to perform noise reduction processing of a radiation image acquired from the radiation detector, corresponding to a plurality of the correction data for the subregions.

10. The radiation control apparatus of claim 1, further comprising:
a correction unit configured to correct a radiation image acquired from the radiation detector, based on the correction data.

11. A radiation imaging system comprising:
the radiation control apparatus of claim 1;
the radiation detector;
the radiation generation unit; and
a control unit configured to control the radiation detector and the radiation generation unit to perform radiation imaging.

12. The radiation imaging system of claim 11, wherein the control apparatus configured to alternates imaging of a correction image and determination of dose value of next correction image to be imaged.

13. A C-arm imaging system comprising:
the radiation control apparatus of claim 1,
the radiation detector,
the radiation generation unit;
a control unit configured to control the radiation detector and the radiation generation unit to perform radiation imaging; and
a display unit configured to display the radiation image.

14. A method for acquiring correction data for an imaging device, comprising:
determining dose values of radiation generated by a radiation generation unit and irradiated onto a radiation detector which acquires radiation images, the dose values corresponding to measured input-output characteristics of the radiation detector; and
acquiring correction data for the measured input-output characteristics of the radiation detector, the correction data based on the images acquired from the detector exposed to the radiation at the determined dose values,
wherein the determining includes determining the dose values to acquire the correction data such that an interval of doses of radiation irradiated onto the radiation detector is smaller as an increase amount of a pixel value is smaller in a range where the pixels of the radiation detector start to be saturated.

15. The method of claim 14, further including:
measuring the input-output characteristics indicating relationship between incoming dose values and the pixel output values,
wherein the determining the dose values are determined so that in each exposure dose value increases in accordance with a rate of increase in the pixel output values.

16. The method of claim 14,
wherein the measuring the correction images are acquired by multiple exposures of X-ray at different doses, and
wherein the determining the dose values are determined so that more numbers of exposures are performed within a dose range where the input-output characteristics is approximated by a linear function than within a dose range where the input-output characteristics is approximated by a nonlinear function.

17. A non-transitory computer readable storage medium storing one or more programs for execution by one or more processors of a computer system, the one or more programs comprising:
instructions for determining dose values of radiation generated by a radiation generation unit and irradiated onto a radiation detector which acquires radiation images, the dose values corresponding to measured input-output characteristics of the radiation detector; and
instructions for acquiring correction data for the measured input-output characteristics of the radiation detector, the correction data based on the images acquired from the radiation detector exposed to the radiation at the determined dose values,
wherein the instructions for determining includes instructions for determining the dose values to acquire the correction data such that an interval of doses of radiation irradiated onto the radiation detector is smaller as an increase amount of a pixel value is smaller in a range where the pixels of the radiation detector start to be saturated.

18. An information processing apparatus comprising:
an acquisition unit configured to acquire, based on images obtained by irradiating with radiation from a radiation generation unit a radiation detector with a dose varied in a plurality of stages, a first input-output characteristic of the radiation detector indicating a relation of pixel values of the images to the dose with which the radiation detector is irradiated; and a determination unit configured to determine dose values based on the acquired first input-output characteristics such that an interval of the doses of radiation irradiated onto the radiation detector is smaller as an increase amount of a pixel value is smaller in a range where the pixels of the radiation detector start to be saturated.

* * * * *